Oct. 10, 1961     J. W. WILLIAMSON     3,004,208
PHASE CONVERTER
Filed Feb. 18, 1955
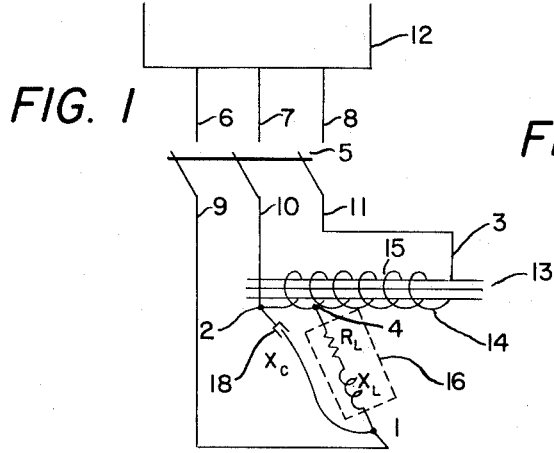
FIG. 1
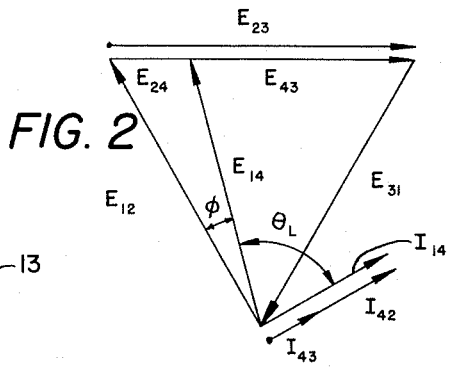
FIG. 2
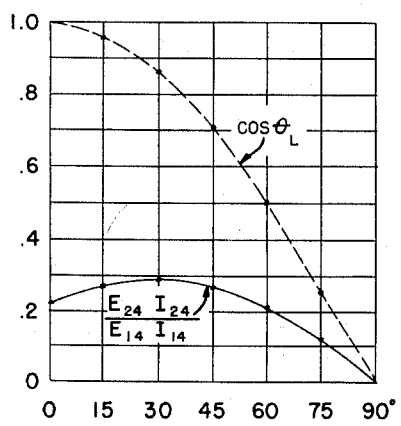
FIG. 3
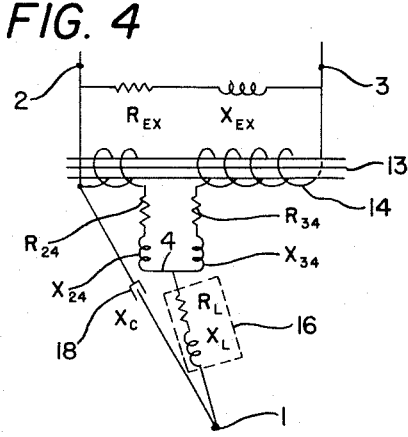
FIG. 4
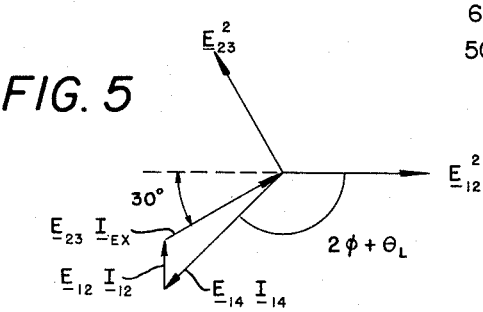
FIG. 5
FIG. 6
INVENTOR.
JAMES W. WILLIAMSON
BY *Alfred C Body*
ATTORNEY

United States Patent Office 3,004,208
Patented Oct. 10, 1961

3,004,208
PHASE CONVERTER
James W. Williamson, Cleveland, Ohio, assignor to Ajax Magnethermic Corporation, Youngstown, Ohio, a corporation of Ohio
Filed Feb. 18, 1955, Ser. No. 489,200
12 Claims. (Cl. 321—57)

This invention relates to the art of electric phase converters and, more particularly, to converters from three-phase to single-phase electric power with a balanced or approximately balanced three-phase power.

The invention is particularly adapted to the conversion of three-phase electrical power to single-phase power where the single-phase power is large and of lagging power-factor and will be described with particular reference thereto, although it will be appreciated that it is not so limited.

Large lagging power factor single-phase loads are encountered in industry; for example, in induction-heating and induction-melting installations and in various types of welders, notably flash welders. Also, such loads are encountered in airplanes or in small manufacturing establishments where the single-phase load may be "large" in relation to the available generator capacity in the case of the airplane, or the available power-transformer capacity supplying utility power in the case of the manufacturing establishment, although such load may be small by other standards such as the available power from an electric utility.

Such single-phase loads and, particularly, lagging power factor single-phase loads can be particularly disadvantageous in the above cases where the power must be supplied from a three-phase power source.

With lagging power factors, the volt-ampere demand on the transmission lines and other electrical apparatus is higher than the actual watts of power which must be supplied and apparatus and wires to supply these extra volt amperes are expensive. Therefore, capacitors are usually employed for power-factor correction. These capacitors are usually connected in permanent parallel relationship with the load (if a voltage-matching transformer is employed, the "load" is here thought of as viewed from the primary of this transformer) so that a single switch or contactor energizes or de-energizes both the load and the parallel capacitors simultaneously. Such capacitors provide no other advantages except to improve the power-factor demand on the single-phase source. Even if sufficient capacitors are employed to completely compensate for the lagging power-factor, the problem of the unbalance of the single-phase load on a three-phase power source remains. It is desirable, if possible, to convert the single-phase load to a three-phase load.

The disadvantages of a single-phase load become apparent in a number of different instances. For example, a manufacturing plant in an isolated area may be supplied through the use of transmission lines with three-phase electrical power. It is quite possible that a single-phase load added to one of the branches of the transmission line would overload that branch while, if the single-phase load were converted to three-phase load, the transmission line could then safely handle the total power demand. Thus, for maximum use of such transmission lines, the current to each of the three incoming lines should be the same.

Another example is in manufacturing plants which employ transformers to reduce the incoming voltage from a value permitting efficient transmission of electrical power to a value low enough to be considered safe within the plant. The cost of such a transformer installation for a given total volt-ampere rating is minimum if the load which is to be supplied is a balanced three-phase load. Usually, such an installation is put in with a size somewhat in excess of immediate requirement to allow for future growth. If a new load, however, is to be added, such as a large welder or an induction-heating installation as a single-phase load, it is possible that the transformer installation will be overloaded, thus necessitating the addition of a new transformer. However, oftentimes if the new load can be converted to a three-phase load, the existing transformer installation will suffice.

Another problem with single-phase loads on three-phase power sources is that the switching on or off of a large single-phase load connected to a single-phase of a power system has a disturbing effect on the voltage of the phase to which the single-phase load is connected and may create unpleasant flickerings of the electric lights.

The desirability of a practical arrangement for supplying a large single-phase load from a three-phase power source with balanced loading on each of the phases of the power source has been recognized for some time and this is particularly so where, as is usual in industrial practice, the single-phase load has a lagging power factor. Various methods have been proposed in the past for three-phase to single-phase power conversion but such methods, so far as I am aware, have always required relatively large volt-ampere ratings of the transformers. In fact, the combined volt-amperes rating of such transformers have usually been considerably in excess of the volt amperes delivered to the load.

The present invention contemplates a relatively simple inexpensive three-phase to single-phase power converter which overcomes all of the above referred to difficulties and provides a generally balanced approximately unity power-factor demand on a three-phase power source with a lagging power factor, single-phase load.

In accordance with the invention, there is provided, in combination, apparatus of the general type described, including, in combination, a capacitor having a pair of terminals adapted to be connected between the first and second conductors of a three-phase power system and a transformer having a single winding with the terminals thereof connected between the second and third conductors of the three-phase power source. A single-phase load of lagging power factor is adapted to be connected between the first conductor and a tap on the winding of the transformer. The location of the tap on the winding of the transformer, in accordance with the invention, is important and is located so as to provide in conjunction with a capacitor of appropriate value a generally balanced load on the three-phase power supply.

Thus, as will appear, the size of the capacitor must be related to the volt-amperes to the load, and the one terminal of the load connected to the winding must be appropriately located on the winding to obtain the desired results.

The principal object of the invention is the provision of a new and improved arrangement for converting three-phase electrical power to single-phase electrical power of a lagging power factor with a general balance on the three-phase power, which arrangement is simple in construction, economical to manufacture and electrically efficient.

Another object of my invention is to provide new and improved apparatus for connecting a single phase load of lagging power factor and capacitors to a three-phase supply and deriving a balanced load on the three-phase supply wherein the volt-ampere rating of the required transformer may be materially less (less than 30 percent) than the volt amperes delivered to the load.

Another object of my invention is to provide a new and improved apparatus for connecting a single-phase load of lagging power factor to a three-phase supply and deriving a balanced load on the three-phase supply wherein only a single transformer of conventional type is required.

Another object of my invention is to provide a new and improved apparatus for connecting a single-phase load of lagging power factor and capacitors to a three-phase supply and deriving a balanced load in the three-phase supply which has substantially no waste of reactive volt amperes and operates such that the sum of the reactive volt amperes supplied by the three-phase power source and the reactive volt amperes supplied by the required capacitors is substantially equal to the reactive volt amperes supplied to the single-phase load.

Another object of my invention is to provide a new and improved apparatus for connecting a single-phase load of lagging power factor and capacitors to a three-phase supply and deriving a balanced three-phase load on the three-phase supply wherein the capacitors are connected directly across two terminals of the three-phase supply and may, therefore, normally be operated at a relatively high voltage for capacitors such as, for example, 460 volts.

Still another object of my invention is to provide a new and improved apparatus for connecting or disconnecting a single phase load to or from a three-phase system whereby the load on the three-phase system is at all times either a balanced three-phase load or no load at all and whereby the required switching means may be a single three-phase contactor or the electrical equivalent thereof.

The practice of my invention is not limited to the attainment of a prefect balance between the three phases of the supply which, while requiring a smaller volt-ampere rating of capacitors than for most phase converters proposed heretofore, still requires more volt-amperes of capacitance than required for a partial balance between the three phases of the supply. Accordingly, a further object of my invention is to provide a method of connecting a single-phase load of lagging power factor and capacitors to a three-phase system and deriving a partially balanced load on the three-phase system, according to which the volt-ampere rating of the required transformer is always less than 30 percent of the volt amperes delivered to the load. As when sufficient capacitors for a perfect phase balance are used, only a single transformer of conventional type is required, there is substantially no waste of reactive volt amperes and the capacitors are operated at the voltage supplied by the three-phase power source which, in most commercial applications, will be a satisfactory operating voltage for capacitors.

In unusual cases, the need for a phase converter may exist which will provide a balanced or nearly balanced load on the three-phase supply, yet use a minimum number of capacitors, even at the expense of requiring an increased volt-ampere rating of transformer and of, to some extent, wasting reactive volt amperes. If desired, my phase converter, like certain other phase converters proposed previously, permits a reduction in the required volt amperes of capacitance by the use of a transformer with relatively high-exciting current.

The invention may take physical form in a number of different appearing arrangements of parts and electrical circuits, preferred embodiments of which will be described in detail in this specification and illustrated in the accompanying drawings which form a part hereof, and wherein:

FIGURE 1 is a circuit diagram showing a preferred embodiment of my invention;

FIGURE 2 is a vector diagram for the circuit of FIGURE 1, assuming that the transformer shown may be considered a "perfect transformer" in certain respects which will be explained below;

FIGURE 3 is a plot of the ratio of transformer volt amperes to single-phase load amperes and single-phase load power factor against the single-phase load power factor angle, assuming a "perfect transformer";

FIGURE 4 is a schematic diagram similar to FIGURE 1 showing in lumped form the distributed impedances of the transformer;

FIGURE 5 is a vector diagram showing the relationships which must exist for a balanced load on the three-phase system under certain assumed operating conditions; and FIGURE 6 is a circuit diagram showing an alternative embodiment of my invention as applied to a multi-phase voltage stepup or stepdown arrangement.

Referring now to the drawings wherein the showings are for the purposes of illustrating a preferred embodiment of the invention only and not for the purposes of limiting same, FIGURE 1 shows a three-phase power source 12 connected through wires 6, 7 and 8, switching means 5 and wires 9, 10 and 11 to terminals 1, 2 and 3 of the phase converter. This phase converter is comprised of a capacitive reactor connected between the terminals 1 and 2 and an autotransformer 14, including a magnetic core 13 and a winding 15 having its outer terminals connected to the terminals 2 and 3. This winding 15 also has a tap 4 intermediate its terminals, the exact location of which forms an important part of the invention as will appear. A single-phase load 16 represented by a resistance $R_L$ in series with an inductive reactance $X_L$ is connected between terminal 1 and the tap 4 on the winding 15.

Only a single capacitive reactor 18 is shown. It will be appreciated that this capacitive reactor may be realized physically by one or more capcitors connected in parallel or, if necessary, in electrical series. The voltage rating of these reactors should approximately equal or exceed the voltage between the terminals 1, 2 as is conventional in electrical practice.

The autotransformer 14 is of the conventional type. Its core 13 may be of the totally closed type or may be provided with an air gap either fixed or adjustable for reasons which will subsequently appear. The design of the winding 15 is sufficient to carry the volt amperes of the load, it being appreciated that using the invention, the over-all volt-ampere rating of the autotransformer need be no greater than 30 percent of the volt-ampere rating of the load.

Only one tap 4 is shown on the winding 15. Obviously, a plurality of taps may be provided at various points along the winding, either separated by one or a pluralitv of turns of the winding.

Commercially available transformers are normally designed to have as low a resistance and leakage reactance of windings and as low an exciting current as it is economically feasible to provide. Accordingly, in describing my invention, it will first be assumed that the transformer 14 may be considered a "perfest transformer" in the sense of having negligible resistance and leakage reactance of windings and negligible exciting current. Suppose that, where E is the R.M.S. value of the voltage between any pair of the three incoming transmission lines, and $E_{12}=E_{23}=E_{31}=E$, the instantaneous voltages across terminals 1—2, 2—3, and 3—1 respectively are as follows:

$$e_{12}=\sqrt{2}E_{12} \sin 2\pi ft$$
$$e_{23}=\sqrt{2}E_{23} \sin (2\pi ft-120°)$$
$$e_{31}=\sqrt{2}E_{31} \sin (2\pi ft-240°)$$

where $f$ stands for the frequency in cycles per second and $t$ stands for the time in seconds. The R.M.S. voltages $E_{12}$, $E_{23}$ and $E_{31}$ are distinguished from one another by the use of different subscripts for clarity of notation, even though these voltages are all equal.

The instantaneous voltage $e_{14}$ between terminal 1 and tap 4 on the autotransformer will lag the instantaneous voltage across terminals 1—4 by an angle $\phi$ which can be adjusted between 0° and 60° by movement of the tap on the autotransformer. Let this voltage be represented by $$e_{14}=\sqrt{2}E_{14}\sin(2\pi ft-\phi)$$

Let $i_{14}$ be the instantaneous current through the load. Then this current will lag the voltage producing it by an angle $\phi_L$ such that $$\tan\theta_L=\frac{X_L}{R_L}$$

Hence, $i_{14}$ may be represented by the equation $$i_{14}=\sqrt{2}I_{14}\sin(2\pi ft-\phi-\theta_L)$$

The instantaneous current $i_{12}$ through the capacitive reactance $X_C$ leads the voltage between terminals 1—2 by 90°, hence may be represented by $$i_{12}=\sqrt{2}I_{12}\sin(2\pi ft+90°)$$

The instantaneous power to the single-phase load is $$e_{14}i_{14}=2E_{14}I_{14}\sin(2\pi ft-\phi)\sin(2\pi ft-\phi-\theta_L)$$
$$=E_{14}I_{14}\cos\theta_L-E_{14}I_{14}\cos(4\pi ft-2\phi-\theta_L)$$

The instantaneous power to the capacitive reactance $X_C$ is $$e_{12}i_{12}=2E_{12}I_{12}\sin 2\pi ft\sin(2\pi ft+90°)$$
$$=-E_{12}I_{12}\cos(4\pi ft+90°)$$

Hence, the total instantaneous power is $$e_{14}i_{14}+e_{12}i_{12}=E_{14}I_{14}\cos\theta_L-E_{14}I_{14}\cos(4\pi ft-2\phi-\theta_L)-E_{12}I_{12}\cos(4\pi ft+90°)$$

It is known from the theory of Symmetrical Components that the load on the three-phase system will be a balanced, three-phase load if, but only if, this total instantaneous power is constant with time. Hence, a necessary and sufficient condition for a balanced load on the three-phase system is that $$E_{14}I_{14}\cos(4\pi ft-2\phi-\theta_L)+E_{12}I_{12}\cos(4\pi ft+90°)=0$$

The above equation can be satisfied at all times only if $$E_{14}I_{14}=E_{12}I_{12}$$

and if $$2\phi+\theta_L=90° \text{ or } \phi=45°-(1/2)\theta_L$$

Thus, I have shown that, using the general arrangement shown in FIGURE 1, a balanced load on the three phase system may be attained if the volt-ampere rating of the capacitance is equal to the volt-amperes to the load 16 and if the tap 4 on the autotransformer is adjusted to make the phase angle between the voltage across terminals 1—2 and the voltage between 1—4, 45° minus one half the power-factor angle of the load (assuming, of course, that the transformer may be considered a perfect transformer).

The merit of my phase converter will now be particularly apparent if a comparison is made between the ratio of volt amperes of transformer to volt amperes to the single-phase load 16 with the corresponding ratio for previous phase converters. FIGURE 2 is a vector diagram showing the relation between voltages and currents, still assuming the transformer to be a perfect transformer.

The vectors $E_{12}$, $E_{23}$ and $E_{31}$, of which the projections on the horizontal axis (multiplied by $\sqrt{2}$) represent instantaneous voltages $e_{12}$, $e_{23}$ and $e_{31}$, are equal in magnitude and 120° out of phase with one another. The vector $E_{14}$, representing the instantaneous voltage $e_{14}$ on the load, lags the vector $E_{12}$ by the angle $\phi$ determined by the position of tap 4 on the autotransformer. The vectors $E_{24}$ and $E_{43}$ represent the voltage from terminal 2 to tap 4, and the voltage from tap 4 to terminal 3 respectively. The vector $I_{14}$ represents the current through the load 16. This current is equal to the sum of the current from tap 4 to terminal 2 (represented by the vector $I_{42}$ and the current from tap 4 to terminal 3 (represented by the vector $I_{43}$). Since the autotransformer 14 is assumed to have negligible exciting current, $I_{43}$ and $I_{42}$ are in phase with one another and, therefore, both are in phase with $I_{14}$. The current through the load, represented by $I_{14}$, lags the load voltage $E_{14}$ by the load power factor angle $\theta_L$. Since negligible exciting current and negligible resistance and leakage reactance of windings are assumed, $$E_{24}I_{42}=E_{43}I_{43}$$

from which, since $$I_{14}=I_{42}+I_{43}$$

$$\frac{I_{42}}{I_{14}}=\frac{1}{1+(I_{43}/I_{42})}=\frac{1}{1+(E_{24}/E_{43})}$$

$$=\frac{E_{43}}{E_{43}+E_{24}}=\frac{E_{43}}{E_{23}}$$

Hence, the ratio of transformer volt amperes to single-phase load volt amperes is $$\frac{E_{24}I_{42}}{E_{14}I_{14}}=\frac{E_{24}}{E_{14}}\cdot\frac{E_{43}}{E_{23}}$$

From the "law of sines" of trigonometry, $$\frac{E_{24}}{E_{14}}=\frac{\sin\phi}{\sin 60°}=(2/\sqrt{3})\sin\phi$$

and from the law of sines, the principle that the exterior angle of a triangle is equal to the sum of the two opposite interior angles and the relationship $E_{23}E_{31}$, $$\frac{E_{43}}{E_{23}}=\frac{\sin(60°-\phi)}{\sin(60°+\phi)}$$

Hence, the ratio of transformer volt amperes to single-phase load volt amperes is $$\frac{E_{24}I_{42}}{E_{14}I_{14}}=(2/\sqrt{3})\frac{\sin\phi\sin(60°-\phi)}{\sin(60°+\phi)}$$

The phase angle $\phi$ between the voltage on the capacitors and the voltage on the single-phase load has been determined previously and is $$\phi=45°-(1/2)\theta_L$$

$\theta_L$ being the single-phase load power factor angle. Hence, the ratio of transformer volt amperes to load volt amperes can be calculated for any load power factor angle $\theta_L$. Results for several values of $\theta_L$ are as follows:

| Load Power Factor Angle $\theta_L$ | Load Power Factor | Ratio $E_{24}I_{42}/E_{14}I_{14}$ of Transformer Volt Amperes to Single-Phase Load Volt Amperes |
|---|---|---|
| 0° | 1.000 | 0.219 |
| 15° | 0.966 | 0.272 |
| 30° | 0.866 | 0.289 |
| 45° | 0.707 | 0.272 |
| 60° | 0.500 | 0.218 |
| 75° | 0.259 | 0.1295 |
| 90° | 0 | 0 |

The above results have been plotted in FIGURE 3.

The values for a load power factor of 90° are given in parenthesis, since they apply to my invention only as a limiting case. If the single phase load 16 has only inductive reactance and no resistance, then it may be connected directly across terminals 1—2. Therefore, zero autotransformer turns are required between terminal 2 and tap 4. In fact, the autotransformer would serve no purpose, and my invention would be inapplicable for a zero power factor load. But for a low power factor load, there is a tremendous advantage in the use of my invention, since the ratio of transformer volt amperes to load volt amperes approaches zero as the load power factor angle approaches 90°. Even for single-phase loads of moderately lagging power factor, there is a startling advantage in the use of my invention, since in no case is it necessary to provide more than 29 percent as many volt amperes of transformer capacity as are to be delivered to the load, whereas, in previous phase converters, it has usually been necessary to provide a number of volt amperes of transformer capacity in excess of 100 percent of the volt amperes delivered to the single-phase load.

As stated above, my invention, when employed with a transformer having low resistance and low leakage reactance of windings and low exciting current, requires, for perfect phase balancing, the use of a number of volt amperes of capacitance equal to the volt amperes delivered to the load. In some cases, a slight unbalance can be tolerated, and it may not be considered economic to provide as many volt amperes of capacitance as are to be delivered to the load. In such cases, fewer capacitors can be provided but for the best possible balance of the load on the three-phase system, the phase angle $\phi$ between the voltage on the capacitors and the voltage applied to the single-phase load should still be $$45° - (1/2)\theta_L$$

or as close to this value as may practically and conveniently be obtained. Making $\phi = 45° - (1/2)\theta_L$ minimizes the time-varying component of power output, thus making possible the attainment of the maximum possible balancing between phases with the given number of capacitors.

It has so far been assumed, for simplicity of illustration, that the autotransformer 14 has negligible resistance and leakage reactance of windings and negligible exciting current. FIGURE 4 is a somewhat schematic representation of my invention as applied to an autotransformer which may have appreciable resistance and leakage reactance of windings and appreciable exciting current. Such an autotransformer is approximately equivalent to a perfect autotransformer shown at 14 in FIGURE 4 with a resistance $R_{24}$ and inductive reactance $X_{24}$ connected between tap 4 and terminal 2, a resistance $R_{34}$ and inductive reactance $X_{34}$ connected between terminal 3 and tap 4, and a resistance $R_{EX}$ and inductive reactance $X_{EX}$ connected in series with one another between terminals 2 and 3. Now let the horizontal and vertical components of vectors be represented mathematically by the real and imaginary components, respectively, of complex numbers. Thus, let $\underline{E}_{12}$ stand for the vector $E_{12}$ as represented mathematically by the sum of a real number, expressing its horizontal component, and an imaginary number, expressing its vertical component. Then, by the use of methods well known in electrical engineering, complex numbers which represent vectors, which in turn represent currents, may readily be calculated. For example, the current from terminal 2 to terminal 3 through the resistance $R_{EX}$ and inductive reactance $X_{EX}$ is represented by the complex number $$\underline{I}_{EX} = \frac{\underline{E}_{23}}{R_{EX} + jX_{EX}}$$

where $j$ is equal to the square root of minus one. According to the above conventions and definitions, I have found that where the autotransformer has appreciable resistance and leakage reactance of windings and appreciable exciting current, a necessary and sufficient condition for a balanced load on the three-phase system is $$\underline{E}_{14}\underline{I}_{14} + \underline{E}_{42}\underline{I}_{42} + \underline{E}_{43}\underline{I}_{43} + \underline{E}_{12}\underline{I}_{12} + \underline{E}_{23}\underline{I}_{EX} = 0$$

As a special case of this general relationship, the autotransformer 14 may have negligible resistance and leakage reactance of winding, in which case $$\underline{E}_{42}\underline{I}_{42} = -\underline{E}_{43}\underline{I}_{43}$$

whence $$\underline{E}_{14}\underline{I}_{14} + \underline{E}_{12}\underline{I}_{12} + \underline{E}_{23}\underline{I}_{EX} = 0$$

This relationship is symbolized geometrically in FIGURE 5, wherein it is assumed that $R_{EX}$ is negligible in relation to $X_{EX}$, so that the current $\underline{I}_{EX}$ lags $\underline{E}_{23}$, the voltage producing it, by 90°. Then, (1) Since $\underline{I}_{EX}$ lags $\underline{E}_{23}$ by 90°, $\underline{E}_{23}\underline{I}_{EX}$ lags $\underline{E}_{23}^2$ by 90°.
(2) Since $\underline{I}_{12}$ leads $\underline{E}_{12}$ by 90°, $\underline{E}_{12}\underline{I}_{12}$ leads $\underline{E}_{12}^2$ by 90°.
(3) Since $\underline{I}_{14}$ lags $\underline{E}_{14}$ by $\theta_L$, $\underline{E}_{14}\underline{I}_{14}$ lags $\underline{E}_{14}^2$ by $\theta_L$.
(4) Since $\underline{E}_{23}$ lags $\underline{E}_{12}$ by 120°, $\underline{E}_{23}^2$ lags $\underline{E}_{12}^2$ by 240°.
(5) Since $\underline{E}_{14}$ lags $\underline{E}_{12}$ by $\phi$, $\underline{E}_{14}^2$ lags $\underline{E}_{12}^2$ by $2\phi$.
(6) From (1) and (4),
  $\underline{E}_{23}\underline{I}_{EX}$ lags $\underline{E}_{12}^2$ by 90°+240°=330°; or $\underline{E}_{23}\underline{I}_{EX}$ leads $\underline{E}_{12}^2$ by 30° (since lagging by 330° is synonomous with leading by 30°).
(7) As stated in (2), $\underline{E}_{12}\underline{I}_{12}$ leads $\underline{E}_{12}^2$ by 90°.
(8) From (3) and (5), $\underline{E}_{14}\underline{I}_{14}$ lags $\underline{E}_{12}^2$ by $2\phi + \theta_L$.

It is seen from FIGURE 5 that, for a given magnitude of single phase load volt ampers $E_{14}I_{14}$, the volt amperes $E_{12}I_{12}$ supplied by the capacitors may be made as small as desired and still obtain a balanced load on the three-phase system by increasing the transformer excitation volt amperes $E_{23}I_{EX}$ and adjusting the phase angle $\phi$ between the voltage on the single phase load and the voltage on the capacitors. So long as the relationship $\underline{E}_{14}\underline{I}_{14} + \underline{E}_{12}\underline{I}_{12} + \underline{E}_{23}\underline{I}_{EX}$ is satisfied, the load on the three-phase system will be a balanced, three-phase load. However, it is in most cases preferred to keep the exciting volt amperes $E_{23}I_{EX}$ small so as to avoid a lagging power-factor load on the three-phase system and to minimize losses associated with the component of current $I_{EX}$ flowing through the windings of the autotransformer. It is in all cases preferred to keep the winding resistances $R_{24}$ and $R_{14}$ as small as can be provided with economical transformer design and the core loss (represented by the resistance $R_{EX}$) as small as can be provided with economical transformer design. The leakage reactance $X_{24}$ and $X_{34}$ may some times be deliberately increased as in welding applications to stabilize the welding current.

For the purpose of describing the invention in actual practice, it will be assumed that it is desired to connect a particular single-phase load to a three-phase power system. The inductance and the resistance of the load may be measured and $\theta_L$ may be calculated or the load may be connected directly across two of the wires of the three-phase system and its power-factor angle $\theta_L$ measured directly with known apparatus.

The angle $\phi$ is then calculated using the formula $\phi = 45 - \frac{1}{2}\theta_L$. Thereafter, the ratio of the voltage $E_{24}/E_{23}$ is calculated from the formula $$E_{24}/E_{23} = \frac{\sin \phi}{\sin (60° + \phi)}$$

One terminal of the load is connected to a tap on an autotransformer having a volt-ampere rating which never need exceed 30 percent of the volt-amperes to the load such that the ratio of the voltages are determined by the above formula.

A capacitor is then selected having a volt-ampere rating equal to the volt-ampere rating of the load.

If the load varies from time to time, the size of the capacitor and the position of the tap on the autotransformer may be varied by employing the above method of determining the proper positions for the tap and the size of the capacitor.

With the above-described arrangement, the calculations have been based on a perfect autotransformer. Obviously, because of the resistance and leakage reactance of any practical autotransformer, there will be a slight unbalance in the three-phase power lines and a slight variation in the power factor thereon from unity. Such variation can be corrected by slightly varying the value of the capacitor or slightly varying the position of the tap or both, but ordinarily the variances are so slight as to be negligible.

It will further be appreciated that capacitors are normally purchased with lumped values and it may not always be possible to obtain a capacitor equal exactly to the volt-ampere rating of the load. Small variations of the volt-ampere rating of the capacitor from the volt-ampere rating of the load are not unduly detrimental and the invention does not require in every instance that there be an exactly balanced load at unity power factor on the three-phase system.

FIGURE 6 shows an alternative embodiment of the invention as applied to a combination voltage changing arrangement and a multiphase to single-phase converter. In FIGURE 6 elements corresponding to those of the preferred embodiment are indicated by the same number with a prime mark added.

In this embodiment, there is shown three single-phase either stepup or stepdown transformers, 50, 60, 70 having primaries 51, 61, 71 respectively connected in delta to the three wires 6, 7, 8 of a three-phase power source through wires 63, 64, 73, 83 and switching means 5'.

These transformers also have secondaries 52, 62, 72, also connected in delta by wires 9', 10', 11', forming respectively the terminals 1', 2', 3' of the phase converter. Obviously, a three-phase type transformer having a common core could be used.

One of the secondaries in the embodiment showing the secondary 72 has a tap thereon forming the terminal 4' of the phase converter. In other words the secondary 72 forms both the autotransformer function of the transformer 14, while at the same time providing a voltage conversion function from the primary 71. Obviously, the winding 72 may be provided with a plurality of taps to permit adjustment as described with reference to the preferred embodiment.

In this embodiment of the invention the load 16' and the condenser 18' will be as described with reference to the preferred embodiment. In adjustment and operation this alternative embodiment operates as described with reference to the preferred embodiment.

If my phase converter is operated to obtain a balanced (rather than a partially balanced) load on the three-phase system, the primary windings may be connected in Y, rather than in delta, since the voltages thereon will still be equal in magnitude and 120° out-of-phase.

The theory of operation of the present invention and preferred embodiments thereof have been described in considerable detail in this specification. Obviously, modifications and alterations will occur to others upon a reading and understanding of the above and it is my intention to include all such modifications and alterations insofar as they come within the scope of the appended claims.

Having thus described my invention, I claim:

1. In phase conversion apparatus, impedance means connected between first and second conductors of three conductors of a three-phase power system, said impedance means consisting substantially solely of capacitive reactor means, an autotransformer having the terminals of its winding connected between the second and third of said conductors, and a single-phase load of lagging power factor having one of its terminals connected directly to said first conductor and having its opposite terminal connected to an intermediate tap on said autotransformer winding, said autotransformer being disconnected from said first conductor except through said capacitive reactor means and said load.

2. In phase conversion apparatus, switching means to connect three terminals respectively to three conductors each from one phase of a three-phase power source, impedance means connected between first and second of said terminals, said impedance means consisting substantially solely of capacitive reactor means, an autotransformer having the terminals of its winding connected between second and third of said terminals, and a single-phase load of lagging power factor having one of its terminals connected directly to said first terminal and having its opposite terminal connected to an intermediate tap on said autotransformer winding, said autotransformer being disconnected from said first terminal except through said capacitive reactor means and said load.

3. The combination of claim 1 wherein the autotransformer winding has relatively low resistance and leakage reactance and a relatively low exciting current, and the tap on the autotransformer is so chosen as to make the phase angle between the voltage on the capacitive reactor means and the voltage on the single-phase load approximately 45° minus one-half the power factor angle of the load.

4. The combination of claim 3 wherein the volt-amperes of said capacitive reactor means is approximately equal to the volt-amperes delivered to the load.

5. The combination of claim 1 wherein the relationship $$\underline{E}_{14}\underline{I}_{14} + \underline{E}_{42}\underline{I}_{42} + \underline{E}_{43}\underline{I}_{43} + \underline{E}_{12}\underline{I}_{12} + \underline{E}_{23}\underline{I}_{23} = 0$$

is approximately satisfied, where $\underline{E}_{14}$ is the R.M.S. voltage from said first conductor across the load to said intermediate tap on the autotransformer winding, $\underline{I}_{14}$ is the R.M.S. current from said first conductor through the load to said intermediate tap on the autotransformer winding, $\underline{E}_{42}$ is the R.M.S. voltage from said intermediate tap on the autotransformer winding to said second conductor, $\underline{I}_{42}$ is the R.M.S. current through said autotransformer winding from said intermediate tap to said second conductor, $\underline{E}_{43}$ is the R.M.S. voltage from said intermediate tap on the autotransformer winding to said third conductor, $\underline{I}_{43}$ is the R.M.S. current through the autotransformer winding from said intermediate tap to said third conductor, $\underline{E}_{12}$ is the R.M.S. voltage across said capacitive reactor means from said first conductor to said second conductor, $\underline{I}_{12}$ is the R.M.S. current through said capacitive reactor means from said first conductor to said second conductor, $\underline{E}_{23}$ is the R.M.S. voltage across the autotransformer winding from said second conductor to said third conductor, and $\underline{I}_{23}$ is the current through the autotransformer winding from said second conductor to said third conductor.

6. The combination of claim 5 wherein the resistances and leakage reactances of the winding and core loss of the autotransformer are made as small as economically feasible, but wherein the exciting current of the autotransformer is made unnecessarily large, so as to reduce the volt-amperes of said capacitive reactor means which must be supplied in order to obtain a balanced load or nearly balanced load on the three-phase power source.

7. In a combined voltage and phase conversion apparatus, a three-phase transformer arrangement having primaries adapted to be connected to a three-phase power system and secondary windings connected in delta, a single-phase load of lagging power factor connected between an intermediate tap of one of said secondary windings and the common connection of the other two secondary windings, and a capacitor connected between said common connection and another common connection between said secondary windings.

8. In a three-phase to single-phase and voltage conversion apparatus, a three-phase transformer arrangement having primary coils connected to the terminals of a three-phase power system, said transformer also having first, second and third multiturn secondary windings connected in a delta arrangement, a single-phase load of lagging power-factor having a first terminal connected to a tap on said first winding and a second terminal connected to an interconnection between said second and third windings, a capacitor connected between said second terminal of said load and the interconnection between said first and second windings, said tap on said first winding being so chosen as to make the phase angle between the voltage on said capacitor and the voltage on the single-phase load approximately 45° minus one-half the power-factor of the load.

9. The combination of claim 1 wherein the three-phase power system comprises a three-phase transformer arrangement having the secondaries connected in delta arrangement, and one of said secondaries having an auto-transformer action.

10. The combination of claim 7 wherein said primaries are connected in delta.

11. The combination of claim 7 wherein switch means are connected between the three-phase power system and the primaries of the three-phase transformer arrangement.

12. In phase conversion apparatus, impedance means connected between first and second conductors of three conductors of a three-phase power system, said impedance means consisting susbtantially solely of capacitive reactor means, an inductive reactor comprising a coil having its end taps connected to the second and third of said conductors respectively, and a single-phase load of lagging power factor having one of its terminals connected directly to said first conductor and having its opposite terminal connected to an intermediate tap on said coil, said coil being disconnected from said first conductor except through said capacitive reactor means and said load.

References Cited in the file of this patent

UNITED STATES PATENTS

| | | |
|---|---|---|
| 2,077,114 | Klinkhamer | Apr. 13, 1937 |
| 2,253,053 | Stevens | Aug. 19, 1941 |
| 2,359,768 | Kiltie | Oct. 10, 1944 |
| 2,407,476 | Crever | Sept. 10, 1946 |
| 2,741,690 | Junker | Apr. 10, 1956 |
| 2,777,983 | Kummel | Jan. 15, 1957 |

FOREIGN PATENTS

| | | |
|---|---|---|
| 512,738 | Great Britain | Sept. 25, 1939 |

UNITED STATES PATENT OFFICE
CERTIFICATE OF CORRECTION

Patent No. 3,004,208                          October 10, 1961

James W. Williamson

It is hereby certified that error appears in the above numbered patent requiring correction and that the said Letters Patent should read as corrected below.

Column 2, line 28, for "rating" read -- ratings --; column 3, line 33, for "prefect" read -- perfect --; column 4, line 30, for "capactive" read -- capacitive --; line 54, for "perfest" read -- perfect --; column 5, line 8, for "$\phi_L$" read -- $\theta_L$ --; line 14, for "$\sqrt[V]{21}$" read -- $\sqrt{21}$ --; column 8, line 19, for "ampers" read -- amperes --.

Signed and sealed this 17th day of April 1962.

(SEAL)
Attest:

ESTON G. JOHNSON                                DAVID L. LADD
Attesting Officer                                Commissioner of Patents